United States Patent [19]

Kondo et al.

[11] 3,996,125

[45] Dec. 7, 1976

[54] APPARATUS FOR ELECTROLYTICALLY PROCESSING ALUMINIUM MATERIAL

[75] Inventors: Morinobu Kondo, Nagoya; Toshiro Takahashi, Shizuoka, both of Japan

[73] Assignees: Riken Keikinzoku Kogyo Kabushiki Kaisha, Shizuoka; Kabushiki Kaisha Chuo Seisakusho, Nagoya, both of Japan

[22] Filed: Apr. 28, 1975

[21] Appl. No.: 572,084

[30] Foreign Application Priority Data

May 2, 1974 Japan .............................. 49-49521
May 22, 1974 Japan .............................. 49-57496

[52] U.S. Cl. .............................................. 204/228
[51] Int. Cl.² ........................................ C25D 11/14
[58] Field of Search ........................ 204/228, 56–58

[56] References Cited

UNITED STATES PATENTS

| | | | |
|---|---|---|---|
| 3,063,929 | 11/1962 | Phelan | 204/228 |
| 3,294,666 | 12/1966 | Wiersma | 204/228 |
| 3,418,222 | 12/1968 | Schaedel | 204/228 |
| 3,622,804 | 11/1971 | Mitchell, Jr. | 204/228 |
| 3,669,855 | 6/1972 | Smith | 204/228 |
| 3,708,407 | 1/1973 | Newman et al. | 204/228 |

*Primary Examiner*—T. M. Tufariello
*Attorney, Agent, or Firm*—Finnegan, Henderson, Farabow & Garrett

[57] ABSTRACT

An apparatus for electrolytically processing aluminium material comprising rectifier means for supplying a pulse power to the electrodes, at least one of which is the aluminium material to be processed, and controller means for supplying a control signal to the rectifier means to enable the same to produce from a multi-phase AC power a pulse power balanced between the phases. The electrodes are connected with each other by a by-pass circuit which is controlled such that the electrodes are short-circuited by the by-pass circuit during the quiescent time of the pulse power to enable the electric charge stored in the electrolytic bath to be discharged rapidly to prevent the trailed natural discharge through the electrolytic path from interfering with the rise of the next pulse, thus preventing the deformation of the pulse waveform supplied to the electrodes.

9 Claims, 9 Drawing Figures

APPARATUS FOR ELECTROLYTICALLY PROCESSING ALUMINIUM MATERIAL

The present invention relates to an apparatus for electrolytically processing aluminium or aluminium alloys, and more particularly to an electrolytic processing apparatus for electrolytically processing aluminium or aluminium alloys by applying a pulse voltage between a pair of electrodes immersed in an electrolytic bath at least one of which electrodes is a piece of aluminium or an aluminium alloy.

When a coloured oxide film is to be produced by the use of an organic acid such as oxalic acid, an inorganic acid such as sulfuric acid, or a mixture thereof as an electrolytic bath, the energy is necessary for impregnating the oxide film with a colouring factor or chromophore such as the carboxyl group, sulfonic acid group, or the like. It is known that this energy is provided by the electrolytic voltage applied to the electrode of aluminium or an alloy thereof (hereinafter referred to as an aluminium material) and that an improvement of colouration is possible by raising this applied voltage. However, a high applied voltage induces an overcurrent flowing through an aluminium material resulting in the yellowing of the produced oxide film. Consequently, it is desirable to employ an electrolytic power of high voltage and low current density for the electrolytic colouration utilizing the abovementioned electrolytic bath. Thus, the pulse electrolysis is suitable for the electrolytic colouration utilizing the abovementioned electrolytic bath.

To cause the electrolytic colouration in a metallic salt solution containing silver, gold, selenium, copper, tin, or the like the energy for impregnating the oxide film with a metal and the energy for oxidizing the penetrated metal are necessary. These energies have been provided by an AC power. However, it is known that since various colour tones or hues result depending on the intensity of the impregnating and oxidizing energies, these energies can be provided by the rise and fall of the pulse of power.

Thus, it can be understood that the electrolytic voltage waveform and current density have various influencies on the colouration of the electrolytically produced coating film, in particular the electrolytic waveform is an important factor for the colouration, and hence the pulse electrolysis is advantageous to the control of colouration.

Heretofore, the pulse waveform necessary for pulse electrolysis was provided by intermitting the DC power produced through a rectifier by the use of a chopper. However, to process a large number of pieces of material at a time with a high current, for example thousands to tens of thousands of amperes, a chopper for low frequencies and a transformer and switches of large capacity are necessary, resulting in a complicated structure of the apparatus and complicated operation required. Thus, the apparatus becomes of large size and expensive.

An example of the pulse electrolysis is disclosed in U.S. Pat. No. 2,726,203 issued on Dec. 6, 1955 to S. C. Rockafellow which actually is concerned with electroplating. However, this patent is given no consideration to the following important problem in the pulse electrolysis. The electrolyte and the electrode or the material to be processed or electrolyzed generally have electrostatic capacity. Since the electrostatic capacity is charged during the power feed period, a graded or trailed discharge occurs during the quiescent period, so that not only the full characteristic of the pulse is degraded, but also it interferes with and degrades the rise characteristic of the next pulse. For this reason a coloured oxide film having a predetermined hue cannot be provided.

Also, when it is intended to effect electrolysis by periodically reversing the polarities of the electrodes both of which are of the aluminium material to be processed, if the amounts of current supplied to the electrodes are different from each other, the resulting hues and thicknesses of the oxide films of the electrodes of the aluminium material are also different from each other. Consequently, colour matching and thickness adjustment of the films are necessary after the process to lead to a troublesome operation.

Accordingly, an object of the present invention is to provide an apparatus of a simple structure for electrolytically processing aluminium material in which rectifier means produces, by being directly provided with a control signal, a desired pulse waveform of a high current suitable for pulse electrolysis to be supplied to the electrodes in an electrolytic bath.

Another object of the present invention is to provide an apparatus for electrolytically processing aluminium material comprising a by-pass circuit for rapidly discharging during the quiescent period of a pulse power the electric charge stored in an electrolytic bath during the power supply period to prevent the degradation of the rise and fall characteristics of the pulse power.

Another object of the present invention is to provide an apparatus for electrolytically processing aluminium material in which a make-and-break signal is supplied to the by-pass circuit simultaneously with the direct application of the control signal to the rectifier means so that the actuation of the by-pass circuit is prevented during the power supply period.

A further object of the present invention is to provide an apparatus for electrolytically processing aluminium material comprising control means for controlling such that a pulse power is supplied to the electrodes with the polarity thereof being reversed periodically and with the amounts of the positive and negative charges being equal.

According to the present invention there is provided an apparatus for electrolytically processing aluminium material comprising rectifier means for supplying a pulse power to the electrodes immersed in an electrolytic bath, at least one of the electrodes being of aluminium material to be processed, and controller means for supplying a control signal to the rectifier means to make and break periodically the rectifier means to enable the rectifier means to produce a pulse output.

According to the present invention there is also provided an apparatus for electrolytically processing aluminium material comprising rectifier means for supplying a pulse power to the electrodes immersed in an electrolytic bath, at least one of the electrodes being of aluminium material to be processed, controller means for supplying a control signal to the rectifier means to make and break periodically the rectifier means to enable the rectifier means to produce a pulse output, and a by-pass circuit connected between the electrodes adapted to discharge during the quiescent period of the pulse power the electric charge stored in the electrolytic bath during the power supply period.

The above and other objects, features and advantages of the present invention will be better understood with reference to the following description and the accompanying drawings, in which.

Figure 1:
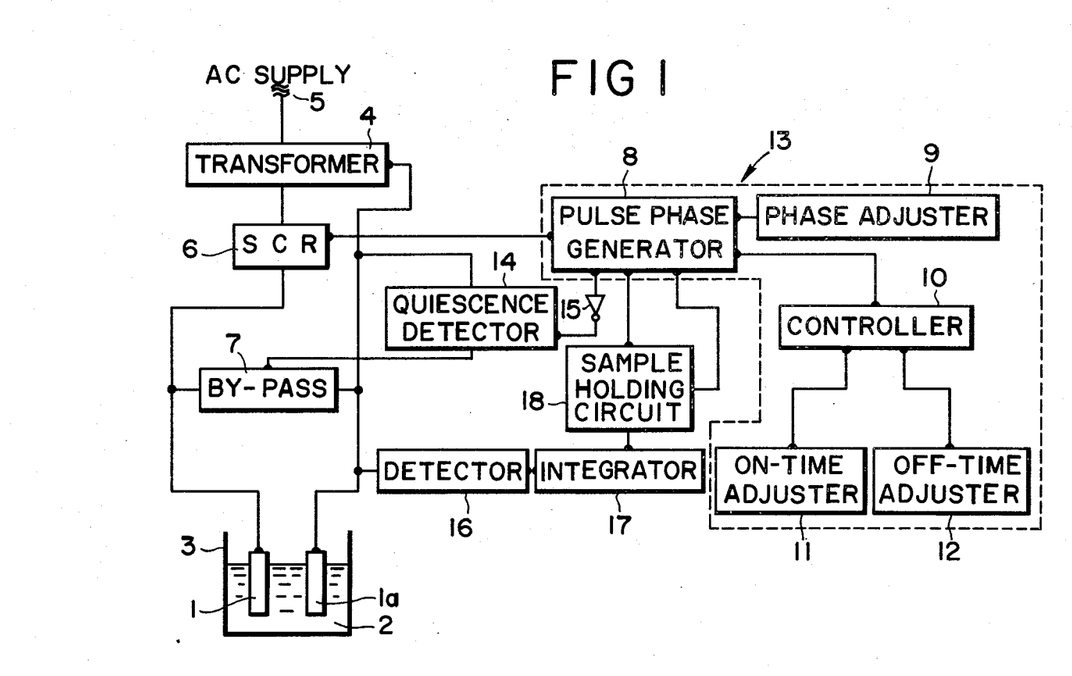
FIG. 1 is the overall system according to the present invention in a block form.
Figure 4:
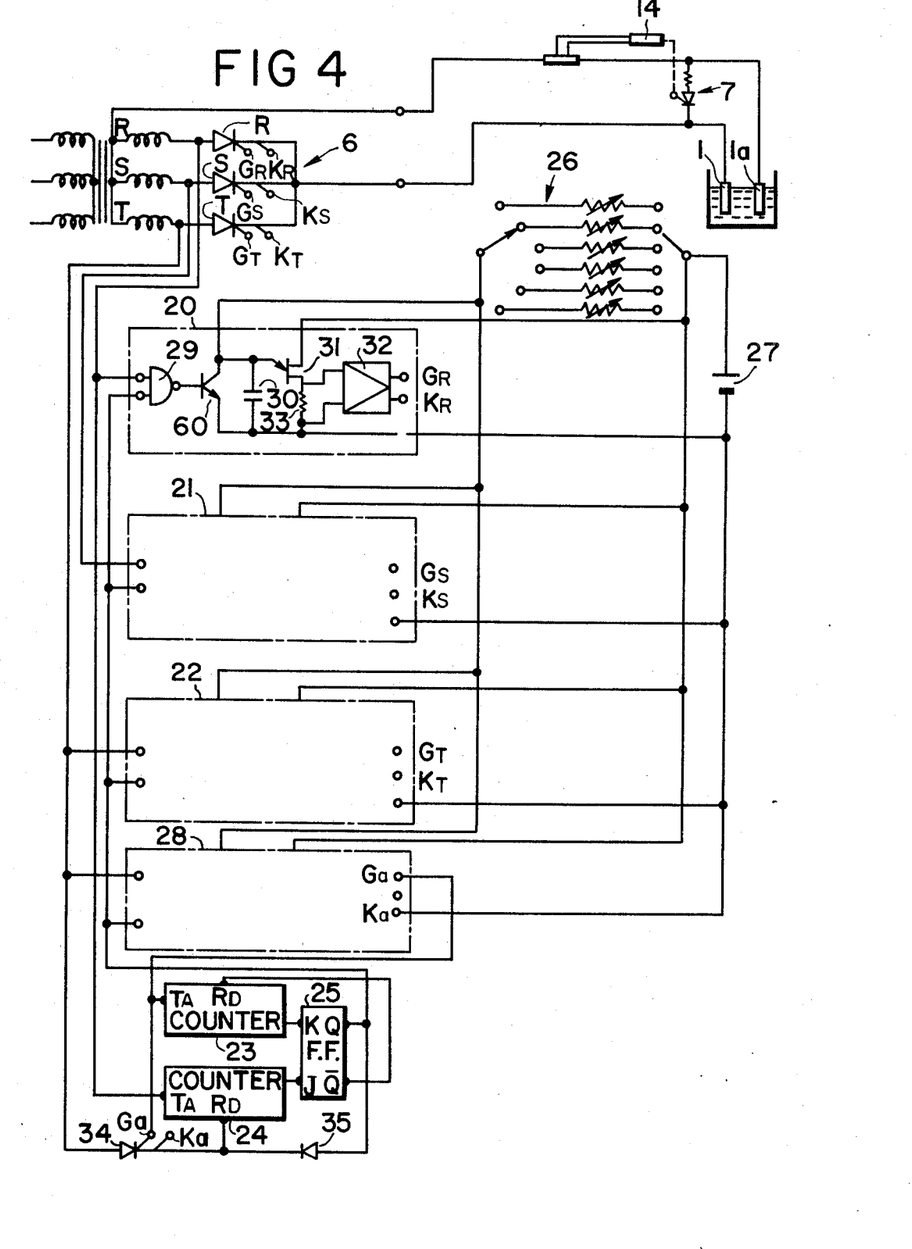
FIG. 4 is an embodiment of the pulse phase generator.

Referring to FIG. 1, a piece of aluminium material to be processed 1 and a counterpart carbon electrode 1a are immersed in an electrolytic bath 2 in a vessel 3. A transformer 4 is provided with an electric power from a three phase AC power supply 5. Each of silicon controlled rectifiers (hereinafter referred to as SCR's) 6 is connected at its anode to the associated phase of the secondary winding of the transformer 4 and at its cathode to the material to be processed 1 (FIG. 4). The neutral point of the secondary winding of the transformer 4 is connected to the carbon electrode 1a. A control mechanism 13 is connected to the gates of the SCR's 6. The control mechanism 13 is composed of a pulse phase generator 8 for gate control of the SCR's 6, a phase adjuster 9 for adjusting the phase of the striking pulses produced by the generator 8, a controller 10 for activating and deactivating periodically the generator 8, and an ON-time adjuster 11 and an OFF-time adjuster 12 for the controller 10.

Figure 2:
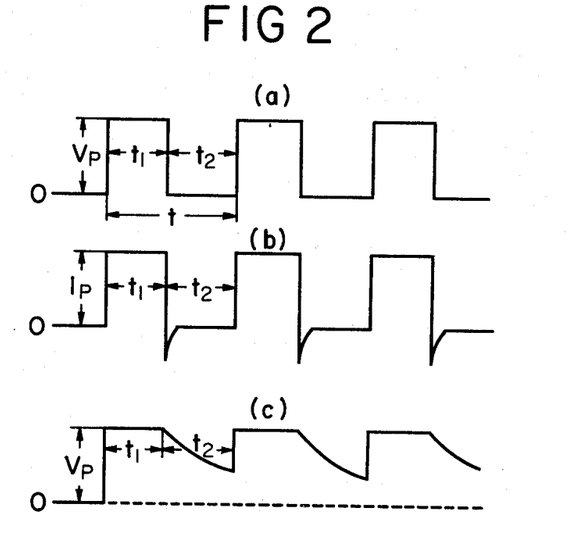
FIG. 2 is the waveforms of the pulse power supplied to the electrodes and passing therethrough.

A by-pass circuit 7 is provided between the electrodes 1 and 1a. A quiescence detector 14, when it has detected the quiescence $t_2$ (FIG. 2a) of the pulse power supplied to the electrodes 1 and 1a, supplies a signal to the by-pass circuit 7 to activate it to form a closed circuit to rapidly discharge the charge stored in the electrolytic bath 2. That is, the by-pass circuit 7 is closed simultaneously with the fall of a pulse to cause a rapid discharge by the rise time of the next pulse to prevent the degradation of the rise and fall characteristics of the pulse power due to a trailed discharge based on the battery effect due to the polarization caused in the electrolytic bath. Thus, the electrolysis can be performed with a pulse power of a desired waveform.

Generally, in the initial stage of the electrolysis the voltage applied to the electrodes is suppressed to a low value to prevent an overcurrent from flowing through the aluminium material to be processed. This is because in the initial stage the electric resistance of the oxide film or coating produced on the aluminium material is low, so that an overcurrent is liable to flow therethrough. For this reason, when the electrolytic voltage is kept low, the output voltage is sometimes not a constant value but of a waveform of a part of the sine wave (hereinafter referred to as the partial sine wave). If the quiescence detector 14 operates in this state, the by-pass circuit 7 is closed even during the power supply period resulting in a short-circuited state to prevent the predetermined pulse voltage from being applied to the electrodes.

The quiescence detector 14 is also connected with an inverter 15 which in turn is connected to the pulse phase generator 8. When the pulse phase generator 8 produces a positive signal, the signal is supplied to the quiescence detector 14 after being inverted its polarity by the inverter 15. Consequently, even if the detector 14 detects the zero value based on the partial sine wave, for example, the detector 14 never closes the by-pass circuit 7. On the contrary, if the pulse phase generator 8 produces a negative signal, this signal is inverted to a positive signal by the inverter 15 and fed to the detector 14. Consequently, upon detecting the zero value of the pulse power, the detector 14 closes the by-pass circuit 7 to rapidly discharge the charge stored in the electrolytic bath. Thus, even if the detector 14 detects the quiescence $t_2$ (FIG. 2) of the pulse power, it does not activate the by-pass circuit 7 so far as the detector 14 is not supplied with a quiescence signal from the pulse phase generator 8.

When both electrodes 1 and 1a are of the aluminium material to be processed and when the electrolytic process is performed by periodically alternating the polarity of the electrolytic power, it is necessary to equalize the amounts of current supplied to the electrodes so that the hues and thicknesses of the coloured aluminium material at the electrodes are made the same.

A detector 16 detects the amounts of the positive and negative currents supplied to the electrodes and supplies the detected values to an integrator 17. The integrator 17 is preferably a Miller integrator and produces as its output the difference between the amounts of the positive and negative currents. The output of the integrator 17 is supplied to a sample holding circuit 18 which in turn supplies a signal based on the difference to the pulse phase generator 8. The pulse phase generator 8 produces a signal adjusted in response to the signal supplied by the sample holding circuit 18 to feed the SCR's 6 to control the amount of the current so that the electrolytic currents supplied to the electrodes are equalized. Thus, the pieces of the aluminium material constituting the electrodes 1 and 1a are covered with oxide films of the same hue and the same thickness.

In operation, the controller 10 periodically makes and breaks the pulse phase generator 8 to enable the generator 8 to supply striking pulses to the gates of the SCR's 6 only during the make periods. Then, the SCR's 6 transform the power from the transformer 4 into a pulse power and periodically supply it to the electrodes. If the quiescence detector 14 detects the quiescence $t_2$ of the pulse power and if simultaneously a negative signal produced by the pulse phase generator 8 is supplied as a positive signal to the detector 14 after being inverted by the inverter 15 into the positive signal, the by-pass circuit 7 is closed to rapidly discharge the charge stored in the electrolytic bath 2. This discharge is completed by the time of the rise of the next pulse, so that the waveform is not deformed. For example, an electrolytic voltage waveform of the period $t$ consisting of the feed or supply time $t_1$ and the quiescent time $t_2$ as shown in FIG. 2a discharges gradually as shown in FIG. 2c if it is not discharged through the by-pass circuit 7. However, if the by-pass circuit 7 is properly operated, the current flows as shown in FIG. 2b, that is, the discharge occurs simultaneously with the completion of the supply period and proceeds rapidly.

Consequently, no deformation of the voltage waveform occurs and the electrolysis can be performed with a desired waveform. Also, even if a partial sine wave is supplied to the electrodes at the initial stage of the electrolysis, and even if the quiescence detector 14 detects the zero voltage based on the partial sine wave, the by-pass circuit 7 is not activated by the action of the inverter 15 so far as the pulse phase generator 8 supplies a positive signal to the SCR 6. Consequently, a proper electrolytic power can be supplied to the material to be processed.

When both electrodes 1 and 1a are of the aluminium material to be processed, the detector 16 detects the amounts of the positive and negative currents, the difference between which is detected by the integrator 17. The output of the integrator 17 based on the difference is stored in the sample holding circuit 18 to adjust the pulse phase generator 8 to modify the signal supplied by the generator 8 to the SCR 6 so that the currents supplied to the electrodes 1 and 1a are equalized.

A more detailed embodiment of the system according to the present invention shown by the block diagram of FIG. 1 will next be described with reference to FIG. 3. The system comprises the transformer 4 connected to a multi-phase AC source, preferably three-phase AC source, the rectifier 6 including thyristors 19, positive and negative pulse phase generators 8a and 8b to supply a signal for controlling the pulse voltage to the thyristors 19, the controller 10 for the positive and negative pulse phase generators 8a and 8b consisting of timers $T_1$ to $T_6$, and a rotary switch drive time control timer T interlocked with the timers $T_1$ to $T_6$ and the voltage setting circuits of the pulse phase generators 8a and 8b.

The controller 10 consists of the timer $T_1$ for controlling the positive supply or feed time, the timer $T_2$ adapted to be activated by a positive feed time completion signal and to supply a negative feed time completion signal to the timer $T_1$ for controlling the negative feed time, the timer $T_3$ for receiving the signal from the timer $T_1$ and for determining the positive pulse width or feed time (supply period), the timer $T_4$ adapted to receive the signal from the timer $T_3$ and supply the quiescent time completion signal to the timer $T_3$ for controlling the quiescent time, the timer $T_5$ adapted to receive the signal from the timer $T_2$ for determining the negative pulse width or feed time, and the timer $T_6$ adapted to receive the signal from the timer $T_5$ and supply the quiescent time completion signal to the timer $T_5$ for controlling the quiescent time. The positive feed signal $a$ from the timer $T_3$ is supplied to the positive pulse phase generator 8a, and the negative feed signal $b$ from the timer $T_5$ is supplied to the negative pulse phase generator 8b. Each of the timers $T_1$ to $T_6$ has a time constant circuit consisting of a variable resistor and a capacitor for time setting. These time constant circuits are coupled with the rotary switch drive time control timer T so that they can automatically set the time by the signal from the timer T. Of course, each timer may be operated manually to take any pulse width and feed time as desired.

The operation of the timer is such that if a signal (A) is supplied to a pair of timers, for example the timers $T_1$ and $T_2$, the timer $T_1$ produces an output (which is supplied to the timer $T_3$) which disappears after the time $C_1R_1$ but instead the timer $T_2$ produces an output (which is supplied to the timer $T_5$) which also disappears after the time $C_2R_2$ and simultaneously with the disappearance of the output of the timer $T_2$ the timer $T_1$ produces an output. This operation is repeated.

An automatic operation of the system will next be described. A start signal A preset depending on the colour desired to colour the aluminium material and the composition of the electrolytic bath is supplied to the timer $T_1$ and the rotary switch drive time control timer T. The time setting of the timers $T_1$ to $T_6$ is automatically performed by the present signal from the timer T. The start signal A is also supplied to the phase generators 8a and 8b to automatically control the signal for the peak voltage selection to be supplied to the thyristors 19. The signal supplied to the timer $T_1$ activates the timer $T_1$ during the automatically determined positive feed time. During this time the timers $T_3$ and $T_4$ are operated only during the determined times, respectively, to produce the pulse width and quiescent time signals. The pulse width or feed time signal is supplied to the positive pulse phase generator 8a. The positive pulse phase generator 8a has been supplied with the start signal A or the signal from the timer T and has been set at a positive voltage by this signal, so that only during the time period determined by the feed time signal from the timer $T_3$ the positive current having a preselected peak voltage is supplied to the electrolytic bath 2. On the other hand, the timer $T_1$ is operated during a preset time. When this operation is completed, a completion signal is supplied to the timer $T_2$ to operate it to supply a signal to the timers $T_5$ and $T_6$ during the preset negative feed time. The timers $T_5$ and $T_6$ are operated during the preset negative pulse width (that is, the negative feed time) and the quiescent time to allow the timer $T_5$ to supply a negative feed signal $b$ to the negative pulse phase generator 8b. While receiving a signal from the timer $T_5$ the negative pulse phase generator 8b supplies a signal to the thyristor 19 in accordance with a preset negative peak voltage to provide the electrolytic bath with a power of a predetermined voltage. Then, the timer T starts the next operation to cause respective operations in accordance with a new condition.

Figure 3:
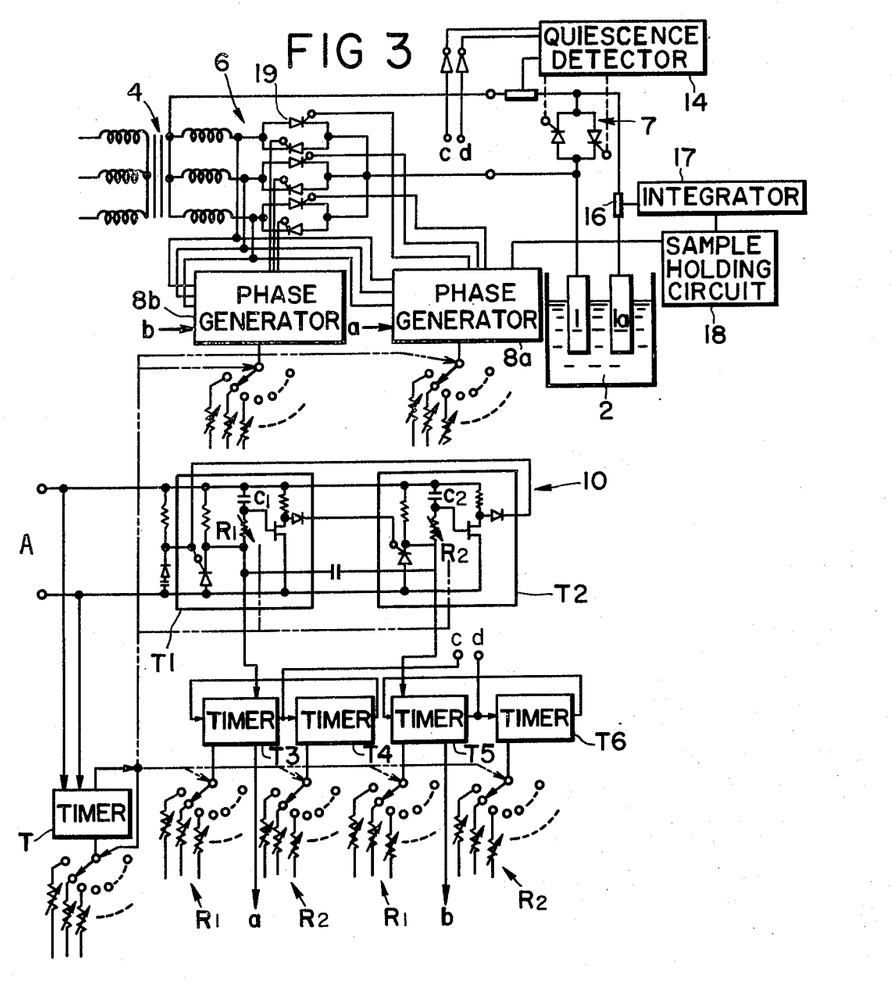
FIG. 3 is a diagram of the system according to the present invention showing in some detail the structures of the rectifier, pulse phase generator, and controller.

The variable resistors of the timers $T_3$ to $T_6$ shown in FIG. 3 correspond to the variable resistors of the timers $T_1$ and $T_2$ shown. However, instead of the timer employing the variable resistor the diode matrix, for example, can of course be employed to perform the same function.

An embodiment of the positive pulse phase generator 8a is shown in FIG. 4. Since the structure of the negative pulse phase generator 8b is similar to that of the positive pulse phase generator 8a, the description thereof will be omitted.

When the power is supplied by repeatedly alternating the feed and interruption by the use of, for example, a thyristor rectifier in which SCR's control the three-phase AC power, if the phase control of the SCR's is performed by supplying the feed signal for a constant time synchronizingly with the three-phase AC power supply, the output waveform of the rectifier is different between the time that the output voltage of the rectifier is low and the time that the output voltage is high, resulting in the imbalance of the three-phase AC power supply. Consequently, as the pulse phase generator the one which will be described hereinbelow is preferable.

It is supposed that the components of the three-phase AC power supply are denoted by R-, S-, and T-phases. A phase generator 20 for the R-phase, a phase generator 21 for the S-phase, and a phase generator 22 for the T-phase are connected to the respective phases, and at the same time interconnected therebetween. Another similar phase generator 28 is connected to the T-phase and the phase generators 20 to 22. The phase generator 28 may not necessarily be employed, but the employment thereof reduces the noise. Output adjusting resistors or a voltage setting circuit 26 and a DC source 27 are connected to the phase generators 20 to 22 and 28 as shown.

Since the phase generators 20 to 22 and 28 are of the same structure, the structue of only the phase generator 20 will be described. The phase generator 20 is composed of, for example, a NAND gate 29, a transistor 60, a capacitor 30, a uni-junction transistor 31, a pulse amplifier 32, and a resistor 33 connected as shown. The DC source 27 is connected to the transistor 60 and the uni-junction transistor 31, while the voltage setting circuit 26 is connected to the transistor 60.

There are also provided a first counter 23 for controlling the feed time, a second counter 24 for controlling the quiescent time, and a flip-flop 25. The flip-flop 25 is preferably a known JK master-slave flip-flop. The input terminal $T_A$ of the first counter 23 is connected with the output terminal Ga of the phase generator 28, while the reset terminal $R_D$ of the counter 23 is connected with the output terminal $\overline{Q}$ of the flip-flop 25. The input terminal $T_A$ of the second counter 24 is connected to the R-phase, while the reset terminal $R_D$ of the counter 24 is connected to the output terminal Q of the flip-flop 25 through a diode 35 and also to the T-phase through a silicon controlled rectifier 34. The gate Ga and the cathode Ka of the silicon controlled rectifier 34 are connected with the corresponding terminals of the phase generator 28. The output terminal Q of the flip-flop 25 is connected to one of the input terminals of the NAND gate of each of the phase generators 20, 21, 22, and 28.

By making the power source, R-, S-, and T-phase components are supplied to the associated phase generators 20, 21, 22, and 28. The T-phase component is supplied to both phase generators 22 and 28. The R-phase component is supplied to the second counter 24 which counts a predetermined number of waves of the R-phase component to supply a signal to the input terminal J of the flip-flop circuit 25. Then, the flip-flop circuit 25 supplies from its output terminal Q the feed signal to the phase generators 20, 21, 22, and 28. The phase generators 20, 21, and 22 supply from their output terminals $G_R$, $K_R$; $G_S$, $K_S$; and $G_T$, $K_T$ phase signals corresponding to the state of the voltage setting circuit 26 to the gates and cathodes $G_R$, $K_R$; $G_S$, $K_S$; and $G_T$, $K_T$ of the SCR's 6R, 6S, and 6T, respectively, to provide a desired voltage output to the electrodes 1 and 1a. At the same time, a signal indicating that a control signal is supplied from the phase generator 22 to the SCR 6T is supplied from the output terminals Ga and Ka of the phase generator 28 to the gate Ga and cathode Ka of the SCR 34 to pass the T-phase component to the reset terminal $R_D$ of the second counter 24 to reset the second counter 24. At the same time, a signal is supplied from the output terminal Ga of the phase generator 28 to the input terminal $T_A$ of the first counter 23 to start the first counter 23 counting. After a predetermined count the first counter 23 supplies a signal to the input terminal K of the flip-flop 25 which in turn supplies from its output terminal $\overline{Q}$ a new signal to the reset terminal $R_D$ of the first counter 23 to reset it.

In the above operation, even if the R-phase signal is supplied to the input terminal $T_A$ of the second counter 24, the counter 24 does not operate unless the activation of the SCR 6T is confirmed by the signal from the phase generator 28. Thus, irrespective of the value of the feed angle the R-, S-, and T-phases can provide the output.

Figure 5:
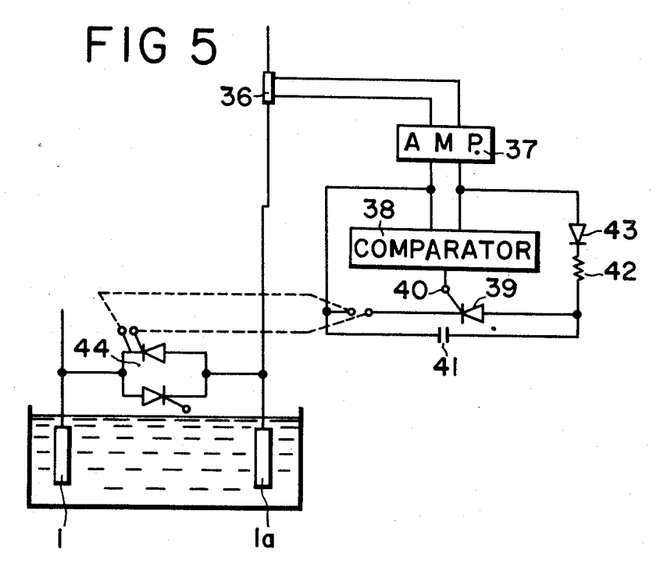
FIG. 5 is an embodiment of the by-pass circuit and quiescence detector of the invention.

As to the by-pass circuit 7 the one shown in FIG. 5 can be employed. A detector 36 is connected to the feed line to the electrode 1a. The signal from the detector 36 is supplied to a comparator 38 through an amplifier 37. The output of the comparator 38 is connected to the gate 40 of an SCR 39. A capacitor 41 is connected in parallel with the SCR 39. The anode of the SCR 39 is connected to the amplifier 37 through a resistor 42 and a diode 43. The cathode side of the SCR 39 is connected to the gate and the cathode of an SCR 44 which is connected antiparallel with another SCR.

Upon detecting the quiescent time of the pulse power the comparator 38 supplies a signal to the gate of the SCR 39 to make it conductive. Then, the charge stored in the capacitor 41 during the feed time is supplied to the gate of the SCR 44 to close the by-pass circuit. Thus, the charge stored in the electrolytic bath during the feed time is rapidly discharged. In this case, if the current reduces below the holding current, the SCR 44 becomes non-conductive to open the circuit.

Figure 6:
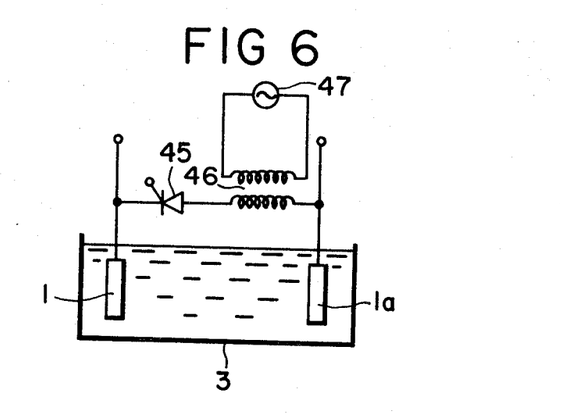
FIGS. 6 and 7 are other embodiments of the by-pass circuit.

Another embodiment of the by-pass circuit 7 is shown in FIG. 6. An SCR 45 and the secondary winding of a transformer 46 which is energized by an AC source 47 are connected in series between the electrodes 1 and 1a. The polarity of the SCR 45 is such that the cathode of the SCR 45 is connected to the negative electrode 1a. The gate of the SCR 45 is adapted to be supplied with the signal indicating the zero value of the fed power from the quiescent detector 14.

When the detector 14 has detected the zero value of the current at the quiescent time of the pulse power and supplied a signal indicating it to the gate of the SCR 45, the SCR 45 becomes conductive to enable the charge stored in the electrolytic bath during the feed time of the pulse power to rapidly discharge through the by-pass circuit 7. If the voltage induced on the secondary winding of the transformer 46 is in the same direction as the forward direction of the SCR 45, the discharge is promoted by the induced voltage on the secondary winding. The current passing through the SCR 45 after the discharge trails as a sinusoidal current determined by the transformer 46, the voltage across the secondary winding of the transformer 46, and the electric resistance between the electrodes. When this current reduces to around the zero value, the SCR 45 is extinguished, that is, becomes non-conductive to open the by-pass circuit 7.

Figure 7:
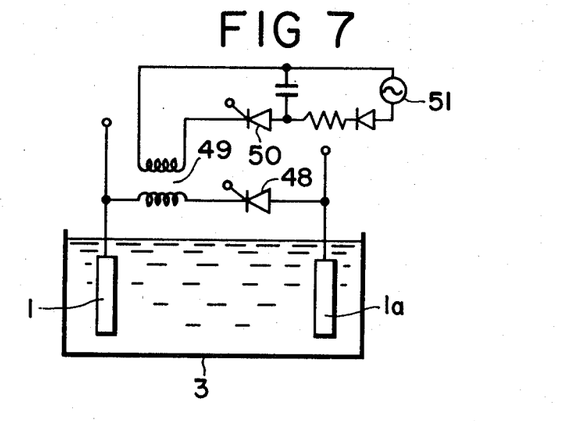

Another embodiment of the by-pass circuit 7 is shown in FIG. 7. An SCR 48 is connected between the electrodes 1 and 1a through the secondary winding of a transformer 49. A capacitor is connected across an AC source 51 through a resistor and a diode. An SCR 50 is connected between the capacitor and the primary winding of the transformer 49. The operations of the SCR's 48 and 50 are synchronized. If the SCR's 48 and 50 are activated synchronously during the quiescent time, the charge stored in the capacitor by the AC source 51 flows instantaneously to induce an electromotive force in the by-pass circuit. The electromotive force expedites a rapid discharge of the charge stored in the electrolytic bath through the by-pass circuit.

Figure 8:
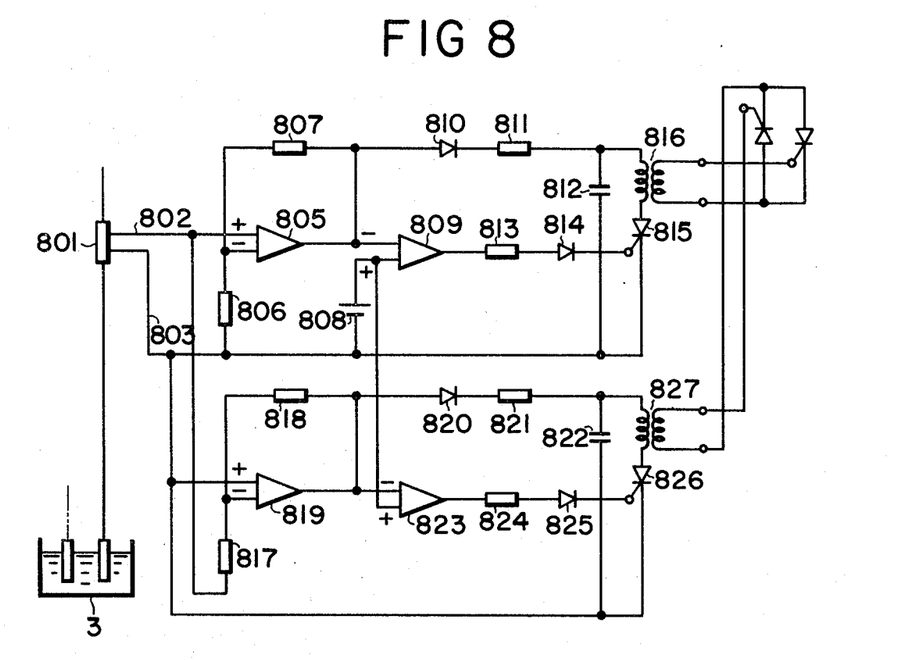
FIG. 8 is another embodiment of the quiescence detector.

An embodiment of the quiescence detector 14 is shown in FIG. 8. When the potential at the point 802 is positive relative to that at the point 803, the positive voltage is applied to the + input of an operational amplifier 805. Then, the positive output of the amplifier 805 is charged in a capacitor 812 through a diode 810 and a resistor 811. At this time the output of an operational amplifier 809 is negative. Then, if the power supply to the electrodes is interrupted, the output of the amplifier 805 becomes zero. Since the + input of the amplifier 809 is always supplied with a positive potential by a low constant voltage source 808, the output of the amplifier 809 now becomes positive to be supplied to the gate of an SCR 815 through a resistor 813 and a diode 814 to strike the SCR 815. Thus, the charge having been stored in the capacitor 812 is discharged through a pulse transformer 816 and the SCR 815 to induce a pulse on the secondary winding of the pulse transformer 816. This pulse is supplied to the gate of the SCR in the by-pass circuit 7 to close the by-pass circuit 7. This circuit charges the capacitor 812 during the feed time and produces a pulse at the end of the feed time. Consequently, this circuit has the advantage that even if the SCR 815 malfunctions without the feed signal, no pulse is produced. When the potential at the point 813 becomes positive, the lower half of this circuit operates similarly to the upper half of this circuit just described.

Figure 9:
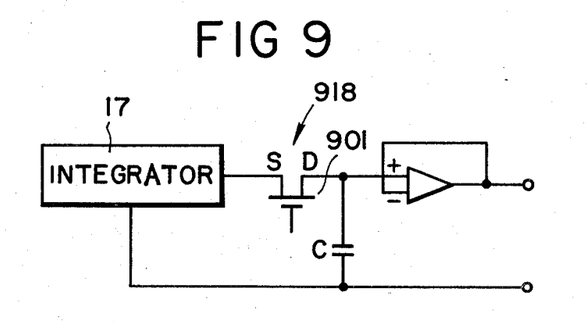
FIG. 9 is an embodiment of the sample holding circuit.

An embodiment of the sample holding circuit 18 is shown in FIG. 9. When the difference between the amounts of the positive current and the negative current is detected by the integrator 17, a pulse is supplied from a pulse generator (not shown) to the gate of a field effect transistor 901 to make the transistor 901 conductive momentarily. Consequently, the value of the output of the integrator 17 at that instant is stored in the capacitor C, so that an operational amplifier continues to produce the output of this value until the next gate signal is supplied to the gate of the transistor 901.

EXAMPLE

The peak voltage, the pulse width, the quiescent time, the PR time (polarity reversing time), and the electrolytic time for the cases in which the oxide film production and colouring are continuously carried out by the use of the electrolytic bath composed of $H_2SO_4$: 150 g/l and $Ag_2SO_4$: 50 mg/l, the oxide film production and colouring are carried out continuously by the use of the electrolytic bath of $H_2SO_4$: 120 g/l, only the colouring is carried out by the use of the electrolytic bath of $H_2SO_4$: 120 g/l, and only the colouring is carried out by the use of the electrolytic bath composed of $H_2SO_4$: 150 g/l and $Ag_2SO_4$: 50 mg/l as well as the hue and thickness of the films produced in various conditions are shown in the following table. As is apparent from the following table, according to the present invention, since the positive and negative peak voltages, the positive and negative pulse widths, the positive and negative quiescent times, the PR time, and the electrolytic time can be selected as desired, variously coloured aluminium materials can be manufactured easily by the same apparatus.

| Composition of Electrolytic Bath | Production of $Al_2O_3$ | | | | | | | | Condition for Colouring Electrolysis | | | | | | | | Produced Coating | |
|---|---|---|---|---|---|---|---|---|---|---|---|---|---|---|---|---|---|---|
| | Peak Voltage (V) | | Pulse Width (msec) | | Quiescent Time (msec) | | PR Time (sec) | | Electrolytic Time (min) | Peak Voltage (V) | | Pulse Width (msec) | | Quiescent Time (msec) | | PR Time (sec) | | Electrolytic Time (min) | Hue | Thickness ($\mu$) |
| | Vp1 | Vp2 | $\tau_1$ | $\tau_2$ | $t_1$ | $t_2$ | $T_1$ | $T_2$ | | $V_{p1}$ | $V_{p2}$ | $\tau_1$ | $\tau_2$ | $t_1$ | $t_2$ | $T_1$ | $T_2$ | | | |
| $H_2SO_4$ 150 g/l $Ag_2SO_4$ 50 mg/l (Opposite Electrode: Carbon) | 16 | — | DC — | | | | | | 20 | 20 | 30 | 16 | 16 | 34 | 17 | 3 | 5 | 20 | yellowish Orange | 9 |
| | 16 | | DC — | | | | | | 15 | 25 | 33 | 16 | 16 | 34 | 17 | 1.5 | 1.5 | 10 | Light Flesh | 9 |
| $H_2SO_4$ 150 g/l $Ag_2SO_4$ 50 mg/l (Both Electrodes: Al) | 30 | 30 | 16 | 16 | 34 | 34 | 15 | 15 | 30 | 33 | 33 | 16 | 16 | 17 | 15 | 1.3 | 1.3 | 10 | Fleshy Orange | 13 |
| | " | " | " | " | " | " | " | " | " | 30 | 30 | 16 | 16 | 34 | 34 | 5 | 5 | 30 | Orange | 13 |
| $H_2SO_4$ 120 g/l (Opposite Electrode: Carbon | 16 | | DC — | | | | | | 5 | 35 | | 50 | | 200 | | | | 30 | Deep Amber | 35 |
| | | | | | | | | | | 38 | | 16 | | 33 | | | | 30 | Deep Amber | 36 |
| $H_2SO_4$ 150 g/l $Ag_2SO_4$ (Both Electrodes: Al) | | | | | | | | | | 33 | 33 | 16 | 16 | 16 | 16 | 5 | 5 | 60 | Deep Orange | 13 |

What we claim is:

1. An apparatus for electrolytically processing aluminum material comprising rectifier means for supplying power to at least a pair of electrodes immersed in an electrolytic bath, at least one of the electrodes being of aluminum material to be processed, controller means including a pulse phase generator connected to the rectifier means for supplying a control signal to the rectifier means to periodically activate and deactivate the rectifier means to enable the rectifier means to have a feed time and a quiescent time for producing a pulse power output to the electrodes, and by-pass circuit means connected between the electrodes for discharging between power pulses the electric charge stored in the electrolytic bath during the power pulses.

2. An apparatus for electrolytically processing aluminum material according to claim 1, in which the by-pass circuit means connected between the pair of electrodes comprises a semiconductor element having a gate, and detecting means for detecting the current supplied to the electrodes, the detecting means supplying a signal indicative of zero current to the gate of the semiconductor element to make the semiconductor element conductive.

3. An apparatus for electrolytically processing aluminum material according to claim 2, in which the gate of the semiconductor element being made conductive is responsive both to the zero current detection of the detecting means and to the signals from the pulse phase generator indicative of the deactivation and activation of the rectifier means.

4. An apparatus for electrolytically processing aluminum material according to claim 2, in which the by-pass circuit means comprises a transformer of which the secondary winding is connected in series with the semiconductor element and an AC source for energizing the primary of the transformer, the positive component of a single-phase alternating current being conducted upon turning-on of the semiconductor element.

5. An apparatus for electrolytically processing aluminum material according to claim 2, in which the by-pass circuit means comprises a mutual induction element and a semiconductor switching element, and electromotive force generating means connected in series on the primary side of the mutual induction element of which the secondary winding is connected in series with the semiconductor element, the semiconductor switching element being adapted to be synchronized so that an instantaneous electromotive force is induced in the by-pass circuit for inducing an instantaneous electromotive force in the by-pass circuit when the semiconductor element and the semiconductor switching element are activated synchronously.

6. An apparatus for electrolytically processing aluminum material according to claim 2, comprising means for controlling the amount of current being fed to the electrodes comprising a current detector, an integrator, and a sample holding circuit, the integrator producing the difference between the amounts of the positive and negative currents supplied to the electrodes and providing the difference to the sample holding circuit to be stored therein, the output signal of the sample holding circuit being adjusted to control the phase generator so that the currents supplied to the electrodes are balanced.

7. An apparatus for electrolytically processing aluminum material according to claim 1, in which the controller means comprises positive and negative phase generators each having at least a voltage setting circuit, positive and negative main timers for receiving a start signal and for controlling positive and negative feed cycles, a subsidiary positive timer for receiving a signal from the positive main timer and for controlling the positive feed pulse width and quiescent time, and a subsidiary negative timer for receiving a signal from the negative main timer and for controlling the negative feed pulse width and quiescent time, the positive and negative phase generators receiving signals from the subsidiary positive and negative timers, respectively, to supply signals for controlling the peak voltage, pulse width, quiescent time, polarity reversing time, and positive and negative feed times to the rectifier means.

8. An apparatus for electrolytically processing aluminum material according to claim 1, in which the pulse phase generator comprises a plurality of phase generators connected to the rectifier means, and the controller means includes means connected to the pulse phase generator for supplying signals indicative of the feed time and the quiescent time of the pulse power comprising a flip-flop having a feed signal generating terminal, an inverse feed signal terminal and a reset terminal for producing a feed signal to be supplied to the pulse phase generators, a quiescent time controlling counter connected to the flip-flop for counting waves of a first phase of the rectifier means to control the quiescent time, and a feed time controlling counter connected to the flip-flop for counting signals from the pulse generator for a last phase to control the feed time.

9. An apparatus for electrolytically processing aluminum material according to claim 8 wherein each of said quiescent time controlling counter and said feed time controlling counter has a reset terminal and wherein said apparatus includes a semiconductor switching element connected between the feed signal generating terminal of the flip-flop and the reset terminal of the quiescent time controlling counter and having, as its gate signal, the signal from the pulse phase generator for the last phase, and wherein the inverse feed signal terminal of the flip-flop is connected to the reset terminal of the feed time controlling counter.

* * * * *